(12) United States Patent
Luke (10) Patent No.: US 7,130,867 B2
(45) Date of Patent: Oct. 31, 2006

(54) INFORMATION COMPONENT BASED DATA STORAGE AND MANAGEMENT

(75) Inventor: James Steven Luke, Cowes (GB)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 10/080,223

(22) Filed: Feb. 21, 2002

(65) Prior Publication Data

US 2002/0116402 A1 Aug. 22, 2002

(30) Foreign Application Priority Data

Feb. 21, 2001 (GB) ................................. 0104227.4

(51) Int. Cl.
*G06F 17/30* (2006.01)

(52) U.S. Cl. ...................................................... 707/200

(58) Field of Classification Search ..................... 707/1, 707/3, 4, 200; 719/321
See application file for complete search history.

(56) References Cited

U.S. PATENT DOCUMENTS

| 5,414,850 A * | 5/1995 | Whiting ....................... 719/321 |
| 5,778,395 A | 7/1998 | Whiting et al. | |
| 5,812,999 A * | 9/1998 | Tateno ............................. 707/3 |
| 6,226,628 B1 * | 5/2001 | Forbes ........................... 707/1 |
| 6,493,709 B1 * | 12/2002 | Aiken ........................... 707/4 |
| 6,535,873 B1 * | 3/2003 | Fagan et al. .................... 707/3 |

OTHER PUBLICATIONS

MQSeries Primer: IB, Oct. 1, 1999.*
MOSeries User Group Meeting: Jun. 8, 1999.*
Rhys Lewis, Advanced Messaging Applications with MSMQ and MQSeries, Dec. 17, 1999.*

* cited by examiner

*Primary Examiner*—Etienne P LeRoux
(74) *Attorney, Agent, or Firm*—Kunzler & Associates (57) ABSTRACT

Provided are methods, apparatus and computer programs for improved data storage and management. The invention can be implemented in a replacement or add-on to existing operating system file systems. Files in a file system are separated into a set of information components and then all information components of the file system are analyzed to identify duplication of information content. When information components with duplicate content are identified, duplicates are deleted from physical storage and indexes are generated to reflect inclusion of the retained copy of an information component in a plurality of different files. Improvements to content searching is enabled, since relevant components can be identified without retrieving whole files and since search results will include fewer duplicate results.

13 Claims, 10 Drawing Sheets

110 — Information Warfare can be summarised as the use of advanced technology to attack, penetrate and inhibit an organisation's use of computer systems. Clearly such an attack poses a major threat to the operational effectiveness of any modern organisation. At a commercial level such attacks may deprive a City Trading House of all trading systems, resulting in massive financial loss.

At a Government level an attack on defence and medical systems may have far more tragic consequences. The technology required to undertake such an attack is readily available, to the extent that an individual with very limited resources is still able to utilise advanced software technology in a highly damaging manner. Two of the most common methods of attacks are the release of computer viruses and the unauthorised entry into a computer system.

FIG. 7

120 — IW Summary.doc —> <1>

<1><1.1><1.1.1>Information Warfare can be summarised as the use of advanced technology to attack, penetrate and inhibit an organisation's use of computer systems.</1.1.1><1.1.2> Clearly such an attack poses a major threat to the operational effectiveness of any modern organisation.</1.1.2><1.1.3> At a commercial level such attacks may deprive a City Trading House of all trading systems, resulting in massive financial loss.<1.1.3></1.1>

<1.2><1.2.1>At a Government level an attack on defence and medical systems may have far more tragic consequences. The technology required to undertake such an attack is readily available, to the extent that an individual with very limited resources is still able to utilise advanced software technology in a highly damaging manner.</1.2.1><1.2.2> Two of the most common methods of attacks are the release of computer viruses and the unauthorised entry into a computer system.</1.2.2></1.2></1>

FIG. 8

| IW Summary.doc | IW Definition.doc |
|---|---|
| Information Warfare can be summarised as the use of advanced technology to attack, penetrate and inhibit an organisation's use of computer systems. Clearly such an attack poses a major threat to the operational effectiveness of any modern organisation. At a commercial level such attacks may deprive a City Trading House of all trading systems, resulting in massive financial loss.<br>At a Government level an attack on defence and medical systems may have far more tragic consequences. The technology required to undertake such an attack is readily available, to the extent that an individual with very limited resources is still able to utilise advanced software technology in a highly damaging manner. Two of the most common methods of attacks are the release of computer viruses and the unauthorised entry into a computer system. | Information Warfare can be summarised as the use of advanced technology to attack an organisation's use of computer systems. |

FIG. 9

| | |
|---|---|
| IW Summary.doc<br>--> <1><br>IW Definition.doc<br>--> <1.1.1.1><br><1.1.1.3> | •<1><1.1><1.1.1><1.1.1.1>Information Warfare can be summarised as the use of advanced technology to attack</1.1.1.1><1.1.1.2>, penetrate and inhibit</1.1.1.2><1.1.1.3> an organisation's use of computer systems.</1.1.1.3></1.1.1><1.1.2> Clearly such an attack poses a major threat to the operational effectiveness of any modern organisation.</1.1.2><1.1.3> At a commercial level such attacks may deprive a City Trading House of all trading systems, resulting in massive financial loss.<1.1.3></1.1><br><1.2><1.2.1>At a Government level an attack on defence and medical systems may have far more tragic consequences. The technology required to undertake such an attack is readily available, to the extent that an individual with very limited resources is still able to utilise advanced software technology in a highly damaging manner.</1.2.1><1.2.2> Two of the most common methods of attacks are the release of computer viruses and the unauthorised entry into a computer system.</1.2.2></1.2></1> |

FIG. 10

| IW Summary.doc | IW Business.doc |
|---|---|
| Information Warfare can be summarised as the use of advanced technology to attack, penetrate and inhibit an organisation's use of computer systems. Clearly such an attack poses a major threat to the operational effectiveness of any modern organisation. At a commercial level such attacks may deprive a City Trading House of all trading systems, resulting in massive financial loss.<br>At a Government level an attack on defence and medical systems may have far more tragic consequences. The technology required to undertake such an attack is readily available, to the extent that an individual with very limited resources is still able to utilise advanced software technology in a highly damaging manner. Two of the most common methods of attacks are the release of computer viruses and the unauthorised entry into a computer system. | Information Warfare, a domain of emerging interest in the market, can be summarised as the use of advanced technology to attack an organisation's use of computer systems. Clearly such an attack poses a major threat to the operational effectiveness of any modern organisation. At a commercial level such attacks may deprive a City Trading House of all trading systems, resulting in massive financial loss. |

FIG. 11

| | |
|---|---|
| IW Summary.doc<br>--> <1><br>- <1.1.1.1.1><br>IW Definition.doc<br>--> (<1.1.1.1><br>-<1.1.1.1.1>)<br><1.1.1.3><br>IW Business.doc<br>--> <1.1> | •<1><1.1><1.1.1><1.1.1.1>Information Warfare<1.1.1.1.1>, a domain of emerging interest in the market,</1.1.1.1.1> can be summarised as the use of advanced technology to attack</1.1.1.1><1.1.1.2>, penetrate and inhibit</1.1.1.2><1.1.1.3> an organisation's use of computer systems.</1.1.1.3></1.1.1><1.1.2> Clearly such an attack poses a major threat to the operational effectiveness of any modern organisation.</1.1.2><1.1.3> At a commercial level such attacks may deprive a City Trading House of all trading systems, resulting in massive financial loss.<1.1.3></1.1><br><1.2><1.2.1>At a Government level an attack on defence and medical systems may have far more tragic consequences. The technology required to undertake such an attack is readily available, to the extent that an individual with very limited resources is still able to utilise advanced software technology in a highly damaging manner.</1.2.1><1.2.2> Two of the most common methods of attacks are the release of computer viruses and the unauthorised entry into a computer system.</1.2.2></1.2></1> |

FIG. 12

| IW Summary.doc | IW Business.doc |
|---|---|
| Information Warfare can be summarised as the use of advanced technology to attack, penetrate and inhibit an organisation's use of computer systems. Clearly such an attack poses a major threat to the operational effectiveness of any modern organisation. At a commercial level such attacks may deprive a City Trading House of all trading systems, resulting in massive financial loss.<br>At a Government level an attack on defence and medical systems may have far more tragic consequences. The technology required to undertake such an attack is readily available, to the extent that an individual with very limited resources is still able to utilise advanced software technology in a highly damaging manner. Two of the most common methods of attacks are the release of computer viruses and the unauthorised entry into a computer system. | Information Warfare, a domain of emerging interest in the market, can be summarised as the use of advanced technology to attack an organisation's use of computer systems. Clearly such an attack poses a major threat to the operational effectiveness of any modern organisation. At a commercial level such attacks may deprive a City Trading House of all trading systems, resulting in massive financial loss.<br>Considering IBM's unique position with Customers in all major market segments, the opportunity in this domain is significant. |

FIG. 13

| | |
|---|---|
| IW Summary.doc<br>  --> <1><br>    - <1.1.1.1><br>    - <1.3><br>IW Definition.doc<br>  --> (<1.1.1.1><br>    -<1.1.1.1>)<br>    <1.1.1.3><br>IW Business.doc<br>  --> <1.1><br>    <1.3> | •<1><1.1><1.1.1><1.1.1.1>Information Warfare</1.1.1.1>, a domain of emerging interest in the market,</1.1.1.1> can be summarised as the use of advanced technology to attack</1.1.1.1><1.1.1.2>, penetrate and inhibit</1.1.1.2><1.1.1.3> an organisation's use of computer systems.</1.1.1.3></1.1.1><1.1.2> Clearly such an attack poses a major threat to the operational effectiveness of any modern organisation.</1.1.2><1.1.3> At a commercial level such attacks may deprive a City Trading House of all trading systems, resulting in massive financial loss.<1.1.3></1.1><br><1.2><1.2.1>At a Government level an attack on defence and medical systems may have far more tragic consequences. The technology required to undertake such an attack is readily available, to the extent that an individual with very limited resources is still able to utilise advanced software technology in a highly damaging manner.</1.2.1><1.2.2> Two of the most common methods of attacks are the release of computer viruses and the unauthorised entry into a computer system.</1.2.2></1.2><br><1.3>Considering IBM's unique position with Customers in all major market segments, the opportunity in this domain is significant.</1.3></1> |

INFORMATION COMPONENT BASED DATA STORAGE AND MANAGEMENT

FIELD OF INVENTION

The present invention relates to improvements to data storage and management systems and methods, and provides support for enhanced data processing applications.

BACKGROUND

The standard architecture of modern operating systems is based on the use of file systems for the storage of both executables and data. A file is a collection of data or executable program instructions which corresponds to a logical unit of storage within a computer system. A file system is a software component (typically a component of an operating system or another computer program) which provides mechanisms for storing, retrieving and working with files. The selection of particular logical positions within the file system for storing user-created files is at least partially controlled by the user, who specifies file names as well as locations. The user may unintentionally store replica files under different file names, and is generally required to recall where in his file system a particular file is stored in order to retrieve it. A user may also store multiple different versions of a file with a great deal of common content. This can lead to an enormous amount of undesirable duplication—wasting scarce storage resources.

In addition, known file access mechanisms are proprietary such that the same information may be duplicated in multiple files in different formats. For example, a section of text extracted from a Lotus WordPro document and pasted into a PowerPoint presentation. Known data storage and management solutions fail to avoid this duplication. (WordPro is a trademark of Lotus Development Corporation).

While compression algorithms are well known for reducing redundancy within a specific file or other collection of data, either to reduce the size of the data during communication or to reduce the storage space required for that data when archiving, compression does not address the problem of duplication between files within an operating system's file system, it requires decompression in order to retrieve the data, and it is only applied to the specified file or collection of data as part of a specified operation.

Additionally, conventional file systems are not optimised for certain types of data mining and general file content searching, partly because the duplication of content between files results in multiple hits when searching and partly because the universal acceptance of the file as the standard logical unit of storage has resulted in reliance on user-specified file names and file-based storage and management schemes.

While files are fundamental to the data management functions of known operating systems, it is also well understood that a typical data file is a collection of data records, each record may comprise a plurality of fields, and each field may include a group of characters. Bits and bytes of data in a computer system are used to represent characters of one of the standard character sets (e.g. ASCII or EBCDIC). Thus, the file is not the most basic element of a standard data hierarchy, but it is the basic logical unit of storage of a conventional operating system's management of data storage. Conventional file systems enable users to invoke operations to create, modify and delete files, and provide mechanisms for sharing files and for maintaining security and integrity, but they are not well adapted for file content searching and data mining and do not address the problem of duplication between files.

SUMMARY OF INVENTION

The present invention provides a data storage architecture which is an alternative to the conventional file-based approach to data storage, enabling improved information management. The data storage architecture of the present invention manages a set of data files and executable programs as a set of separately identifiable Information Components in which each Information Component corresponds to either a data file, an executable file, a portion of such a file, or a collection of file portions. An Information Component may be any block of data or a set of executable instructions comprising an identifiable, storable entity, but is typically a sub-section of a file. The divisions between Information Components are not fixed by the boundaries of user-defined files but instead are determined by an analysis of content and subsequent rationalisation which reduces duplication of content and so enables a reduction in required storage space.

The management of Information Components within a data storage system according to the invention involves analyzing the contents of a plurality of files (or equivalent units of storage) to identify data components and/or executable components within different files of the data storage system which have identical content, and to identify the components which are unique. The unique and duplicated components are then each indexed as separate entities, and duplicate components are deleted to reduce redundancy—without losing any of the total data contents from the system. Where duplicates are deleted to leave a single copy of a component, the component index information is updated to reflect which components are included within which of the plurality of files. Although an update to the index information is preferably triggered by any creation or deletion of a file, an independent background process is preferably responsible for assessing whether storage rationalisation and updating of index information is required following editing of existing files. The indexing of the Information Components maintains the association between sets of Information Components which make up a larger logical entity such as a data file or executable program.

Hereafter, the term "file" will be used to refer to any storable entity, whether data or an executable item, such as would correspond to a logical unit of storage in a conventional file-bdsed storage system. "Files" are logical entities which are generally either created, downloaded or uploaded under user control, and examples include word processed documents, executable programs, presentations and spreadsheet data.

In a first aspect, the present invention provides an information management system for performing the following operations: storing a set of files in an information repository; analyzing the contents of the stored files to identify Information Components which have the same content as other Information Components (i.e. duplicates) within different files of the set of stored files and to identify Information Components which would correspond to the remainder of a stored file after separation of one or more duplicate Information Components; generating index data for each identified duplicated Information Component and generating separate index data for each remainder Information Component, the index data reflecting a logical position of each Information Component within the information repository; deleting duplicate Information Components while retaining at least one copy of each Information Component within the information management system's physical data storage, and updating the index data associated with retained Information Components to reflect a set of logical positions of each Information Component within the information repository corresponding to the positions of the retained copies and deleted copies.

The deletion of redundant, duplicate components can greatly reduce the physical storage space required for a typical data storage repository, and for this reason the invention is particularly advantageous for portable data processing systems and devices which have a relatively small storage capacity (for example, laptop computers, PDAs and other small processing devices). Furthermore, when search operations are performed, the Information Components corresponding to the most relevant components of data files and executables can be identified without having to retrieve an entire file and without the search results including a confusing collection of duplicates, such as many different versions of a file.

The indexing of Information Components according to the invention can be implemented within a system without the knowledge of the system users, who may still use file names and a user-defined directory structure for organizing and locating files, since the well-known file-based storage scheme is preferably retained for presentation purposes and its index scheme is automatically mapped to the Information Component-based index scheme. In such an embodiment of the invention, the present invention provides support for management of data storage and data searching and can be implemented as a stand-alone computer program which supplements the data management functions of the system's operating system or as a replacement to a conventional operating system's file system.

The Information Components' index data preferably comprises markup tags which are stored together with the respective Information Components, with a unique tag pair identifying and delimiting each Information Component, and a markup tag index which associates each tagged Information Component with one or more logical positions within files of the data storage system. The index data preferably defines an information directory structure for the Information Components such that the directory structure can be extracted from stored data and displayed to a user when the data store of Information Components is loaded into memory (e.g. or system startup or when initiated by a user action). The index data may also include an identification of which series of tagged components will be found in particular portions of the data storage system, to speed up the locating of components. This is achieved by using an ordered sequence of markup tags so that it is possible, for example, to associate markup tags which begin with a particular character of the sequence with a particular range of locations within the system.

The analysis of the contents of information items preferably comprises applying a set of rules for Information Component identification and separation. In a first example, files (e.g. text files) which are stored within a data processing apparatus are each initially separated into a set of one or more Information Components. This preferably involves analyzing the contents of each stored file to identify components which correspond to a set of predefined sub-sections or data categories (e.g. text paragraphs or text sentences, figures, tables or rows/columns, presentation slides or text blocks within presentations), and then generating separate index data for each of these components. Note that the Component separation rules may differ for different file types, and an up-front identification of file suffixes can be used to determine which separation rules to apply to each file. The index data for each separate Information Component retains an association with the original file name or index entry. Now every file which is represented in the user's view of a file system is mapped to a set of indexed Information Components.

Subsequently, either in response to this separation of components or as an independent background process, the Information Components are rationalised to reduce unnecessary redundancy. This preferably involves comparing the contents of the Information Components across the set of files using a string match algorithm, running as a background process using spare processor capacity, to discover duplicate copies of data content. For each identified set of identical Information Components (duplicates), all except one are deleted from physical storage and the index information is updated so that the undeleted copy is associated with the plurality of different logical locations within the data repository in which that Information Component's content is required.

In one preferred embodiment, Information Components' contents are also compared to identify Information Components which constitute part of a larger Information Component (again using string matching techniques). The data storage system is then revised to index the duplicated portion of the larger Information Component separately from the unduplicated remainder portion, and the index information for the duplicate copies is updated to reflect a merging of the duplicates—i.e. duplicate copies are deleted, to be replaced by indexes which identify the inclusion of the remaining Information Component within files at a number of different logical positions in the directory structure. This can be extended to any set of Information Components which have common sub-components, although minimum size limits for divisible sub-components can be desirable, for example to avoid overly complex indexes or to ensure that each Component contains sufficient information to be a useful result of a search operation.

In a second aspect, the invention provides a method of managing data storage in a data processing apparatus, the data processing apparatus including an information repository comprising a physical data storage medium and data structures for storing data and index information for locating data in the data storage medium, the method comprising the steps of: analyzing the contents of the set of files to identify components of the file contents which have duplicates within different files within the set, wherein duplicate components are components with the same content; deleting duplicate components from the information repository while retaining at least one copy of each component, and generating index data for the retained copies which reflects the respective logical positions within the information repository corresponding to the positions of the retained copies and their deleted duplicates, and generating index data for remainder components which correspond to the remainder portions of a file after separation of duplicated components which remainder component index data reflects the logical positions of the remainder components within the information repository; and storing the generated index data.

In a third aspect, the invention provides an information storage system including: a data storage medium for storing files and for storing index data representing an information storage directory structure; an executable component for performing the following operations: analyzing the contents of a set of files stored in the data storage medium to identify components of the file contents which have duplicates within different files within the set; deleting duplicate components from the data storage medium while retaining at least one copy of each component, and generating index data for the retained copies which reflects the respective logical positions within the data storage medium of the retained copies and their deleted duplicates, and generating index data for remainder components which correspond to the remainder portions of a file after separation of duplicated components which remainder component index data reflects the logical positions of the remainder components within the data storage medium; and storing the generated index data.

A fourth aspect of the invention provides a computer program, or a set of controller components comprising hardware and/or software, for controlling a data processing apparatus to perform a method as described above. Such a program is preferably implemented as a computer program product comprising program code instructions recorded on a machine-readable recording medium. Such a set of controller components may include a combination of program code instructions and hardware data processing components.

BRIEF DESCRIPTION OF DRAWINGS

Preferred embodiments of the present invention will now be described in more detail, by way of example only, with reference to the accompanying drawings in which:

FIG. 7 represents an example text file;

FIG. 8 represents the addition of markup indexes to the text file of FIG. 7 and indexing of the document;

FIG. 9 represents the situation in which a new text file is created which is a subset of an existing file;

FIG. 10 shows how the Information Store represents the situation of FIG. 9;

FIG. 11 represents creation of a further text file which is a partial match to the text file of FIG. 7;

FIG. 12 shows how the Information Store is updated to reflect the situation of FIG. 11;

FIG. 13 shows the addition of a component text paragraph to the existing text file shown in FIG. 11; and FIG. 14 shows how the Information store is updated to reflect the addition of FIG. 13;

DETAILED DESCRIPTION OF PREFERRED EMBODIMENTS

Figure 1:
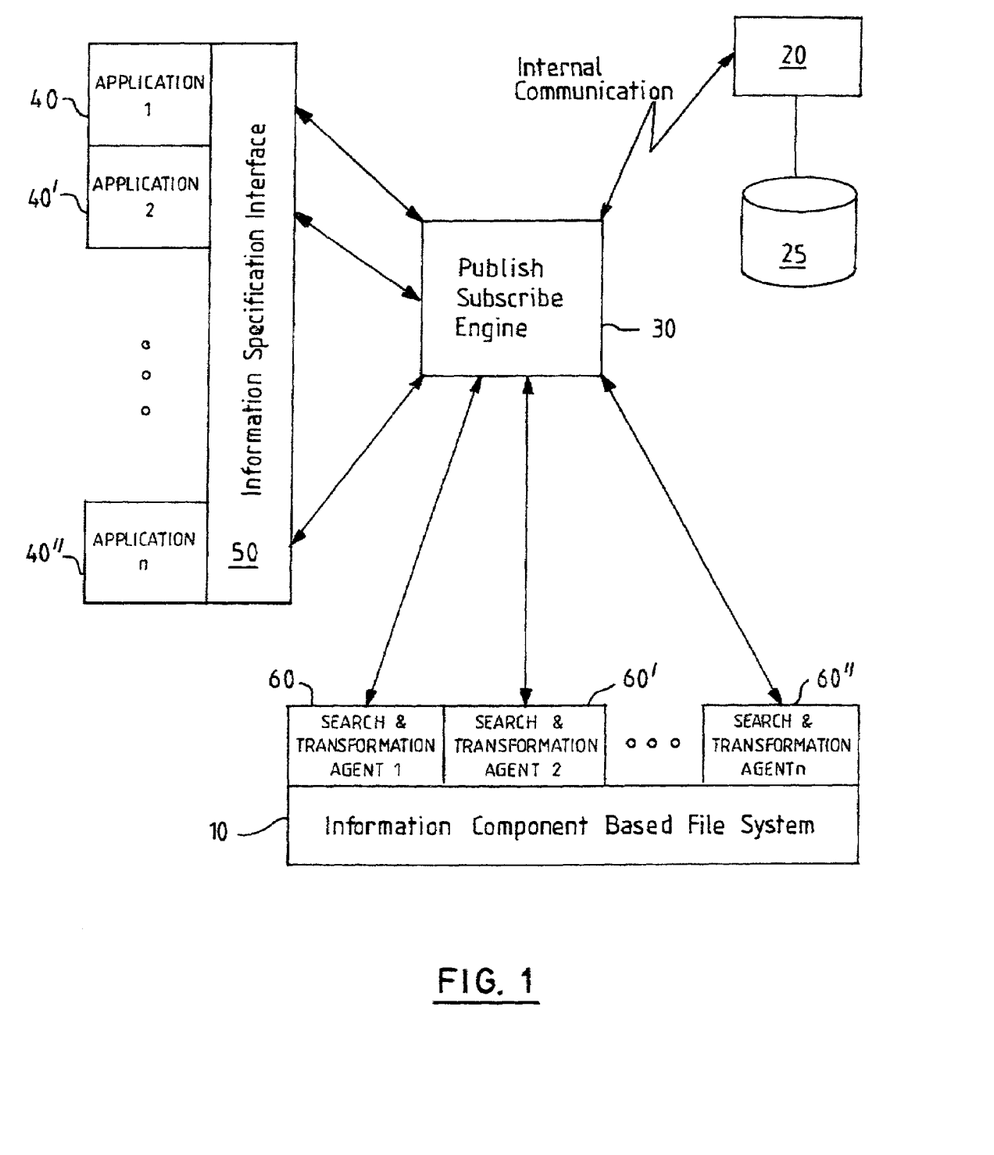
FIG. 1 is a schematic representation of a data storage and management architecture according to an embodiment of the invention.

FIG. 1 shows a computer system architecture including an information component-based data storage system 10 (referred to hereafter as a "file system" for ease of reference). This file system 10 is implemented as an application program which performs storage and retrieval operations and which communicates with other system components, such as an operating system 20 and system storage 25, via a publish/subscribe engine 30. In alternative embodiments, the file system 10 could be implemented as an integral component of an operating system, potentially replacing conventional operating system file systems.

Communication between the file system 10 and a plurality of application programs 40 is provided via an information specification interface 50 and the publish/subscribe engine 30. Access from the publish/subscribe engine 30 to the information component-based data storage system 10 is provided via a set of search and transformation agents 60 which provide enhanced information management functionality. Various components of this architecture will be described in more detail below.

The data storage and management architecture of the invention uses an innovative storage system, suitable for the storage of both executables and data, which challenges reliance on the traditional file-based approach and supports improved information management. The data storage architecture implements an abstraction of individual files into a series of distinct Information Components where each Information Component represents a sub-section of an original file. For example, if the file is a document or a presentation, the file system 10 enables access to sub-sections of this file such as an individual slide in a presentation or a sentence or paragraph within a document. These sub-sections may each represent an Information Component of the file system. These Information Components may be accessed without the need to retrieve the entire document or presentation, since accessing of stored entities is not limited to complete files originally stored under user control.

In a first implementation, the Information Component-based file system 10 stores data files but uses a conventional operating system's file system for storing executables. An appropriate loader process for executables is used to retrieve the executables from the operating system's file system and load them into memory.

The Information Component-based file system 10 also reduces the amount of storage space required for storing a set of files as compared with a conventional file system, due to the removal of component redundancy. For example, if the same component is used in multiple documents or presentations, only one instance is typically retained in storage. This will be described in more detail later, with reference to an example. The removal of component redundancy also enables improved search capability: the search engine will return a reduced number of hits as there are fewer occurrences of the components.

The publish/subscribe engine 30 is used for all communications between the applications 40 and the file system 10. The publish/subscribe engine enables monitoring of information flows by all applications. For example, an e-mail system could maintain a list of subjects of interest. By monitoring the communication between a word processor application and the storage system, the publish/subscribe engine 30 can detect when the user has created new information which may be of interest to the user's colleagues, and pass the information to the e-mail application for distribution. This can be extended to integrated sharing of Information Components throughout an enterprise, with multiple users exchanging Information Components either explicitly or implicitly in a highly scalable environment comprising an enterprise-wide cluster of publish/subscribe engines. A suitable publish/subscribe engine is already commercially available in the form of IBM Corporation's MQSeries Integrator products (IBM and MQSeries are trademarks of IBM Corporation).

The publish/subscribe engine 30 also enables monitoring of information flows by multiple search and transformation agents 60, such that multiple agents can respond to information requests in a competitive manner. Search and transformation agents are known in the art which provide standard information management functionality and are suitable for use with the present invention. For example a search and transformation agent will respond to requests for information storage or retrieval from a word processing application. The invention also facilitates development of search and tansformation agents which provide more advanced information management functionality, but these are not essential to the invention. For example, a search and transformation agent may be created which responds to a Word Processor storage request by creating a summary or a translation of the information and/or which adds meta data to the set of stored Information Components.

The information specification interface 50 enables a high level specification of information requests by an application 40. Applications are not concerned with the mechanism of storage—they simply send requests via the publish/subscribe engine 30 for all information requests (e.g. storage, retrieval, amendment, searching).

In the following sections of this document, the invention will be described using a text file as an example. However the invention is applicable to other file formats and executables. It should also be noted that the examples included in this disclosure are scalable and, in an actual implementation, it is envisaged that the number of files and the size of the extracted components would be larger than those described herein.

Figure 2:
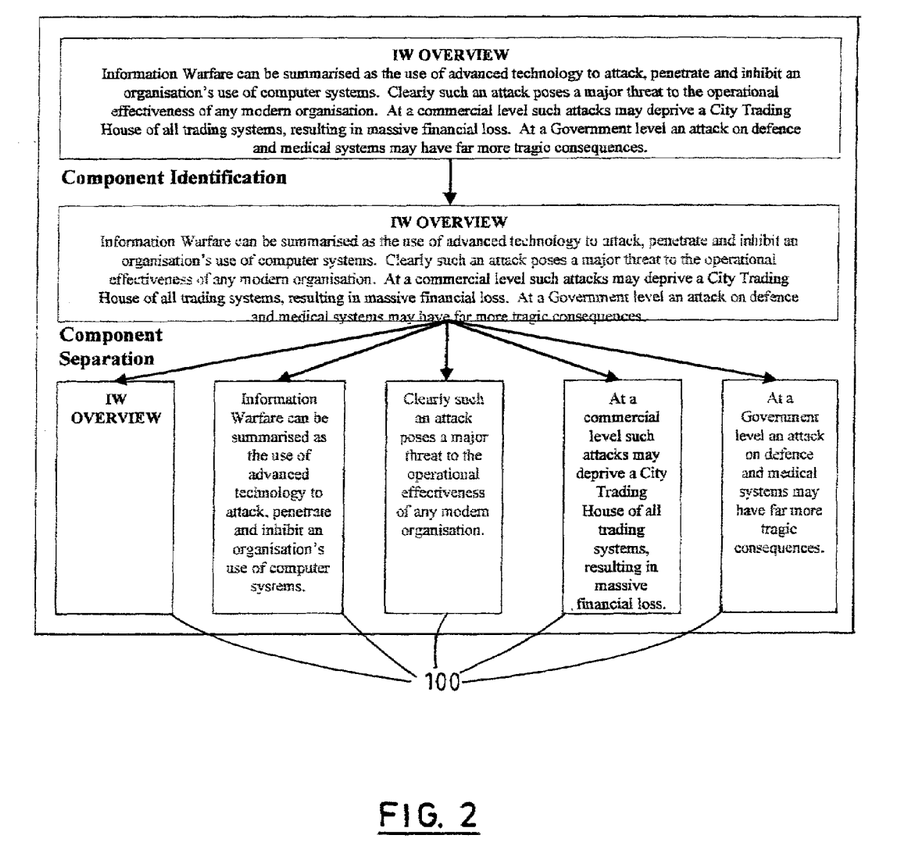
FIG. 2 is a schematic representation of the separation of a text document into Information components, according to an embodiment of the invention.

FIG. 2 shows an example of the logical separation of data into Information Components 100, using a paragraph of text taken from an actual text file. In this example, Information Component separation rules are based on paragraph separators (new line) and punctuation marks, so the title and each sentence are identified as separate Information Components, subject to a minimum Component size.

Figure 3:
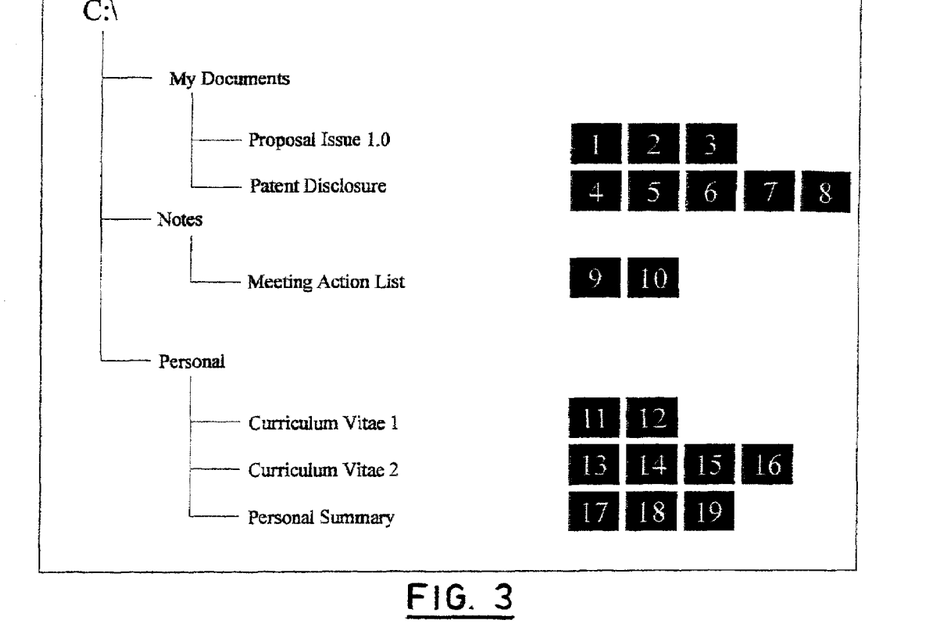
FIG. 3 shows the logical association between files and Information Components, according to an embodiment of the invention.

Each Information Component is given a unique identifier and an indexing system is constructed to associate the original filename with a sequence of Information Components. In this embodiment of the invention, the concept of a directory structure and individual files is maintained for presentation purposes. This is achieved by storing a set of file identifiers comprising the full file name (including the path to it within the user's view of the directory structure) and a description (a set of indexes) of the Information Components making up the file. The indexes of individual components which form part of a file identifier are also stored in association with the Information Components themselves such that the indexes within a file description provide references to a specific set of Information Components. A specific index implementation will be described in more detail later. This initial Information Component separation process is applied to every file such that the original file system is replaced by sets of components mapped to files as shown in FIG. 3.

Figure 4:
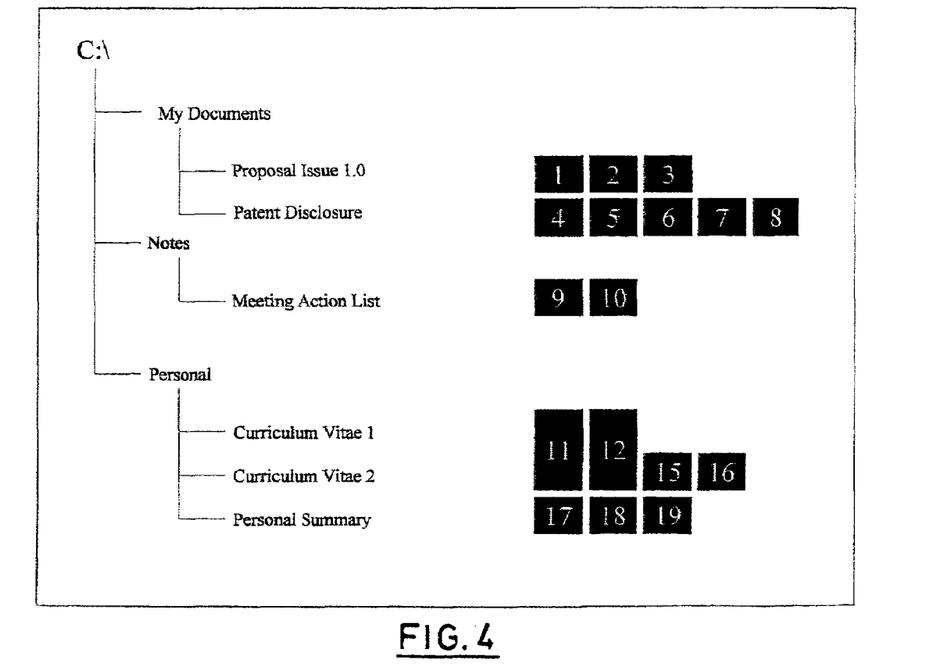
FIG. 4 is a schematic representation of the association between files and Information Components after deletion of duplicate Information Components and updating of index information, according to an embodiment of the invention.

Having separated the content of individual files into a series of Information Components, it is possible to rationalise the Information Components to reduce unnecessary redundancy. Three basic types of rationalisation may be conducted:

Discovery of identical Information Components. For example, referring to FIG. 3, it is possible that Information Components 11 and 12 are identical to Information Components 13 and 14 respectively. Such a match is identified by employing a string matching algorithm, with each Component comprising a separate search string. Identification of these identical components would enable a further revision of the File System as shown in FIG. 4—the duplicate components 13 and 14 are deleted from physical storage and the indexing of the Information components is updated so that files CV1 and CV2 each include Information Components 11 and 12. This updating of indexes involves changing the index information stored in association with the Information components themselves and changing the component description of CV1 and CV2.

Figure 5:
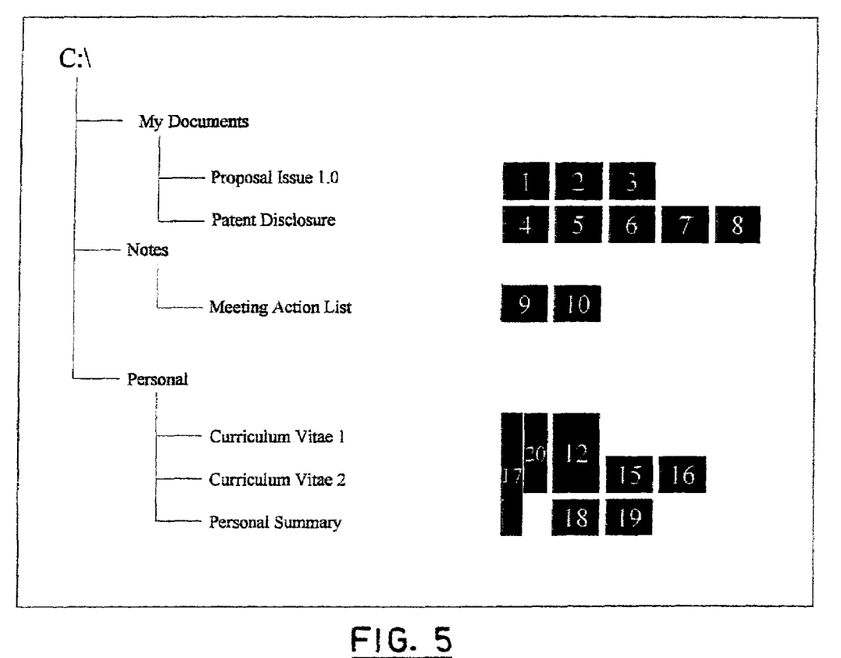
FIG. 5 represents the result of identifying duplicate sub-components of Information Components and consequent rationalisation of the storage of Information Components, according to an embodiment of the invention.

Discovery of Information Components which constitute part of a larger Information Component. For example, referring to FIG. 4, Information Component 11 may include the entire contents of Information Component 17, as well as additional data such as additional text paragraphs which can be separated out as a new Information Component 20. This would enable a further revision of the File System to remove duplication of the contents of Information Component 17, as shown in FIG. 5.

Figure 6:
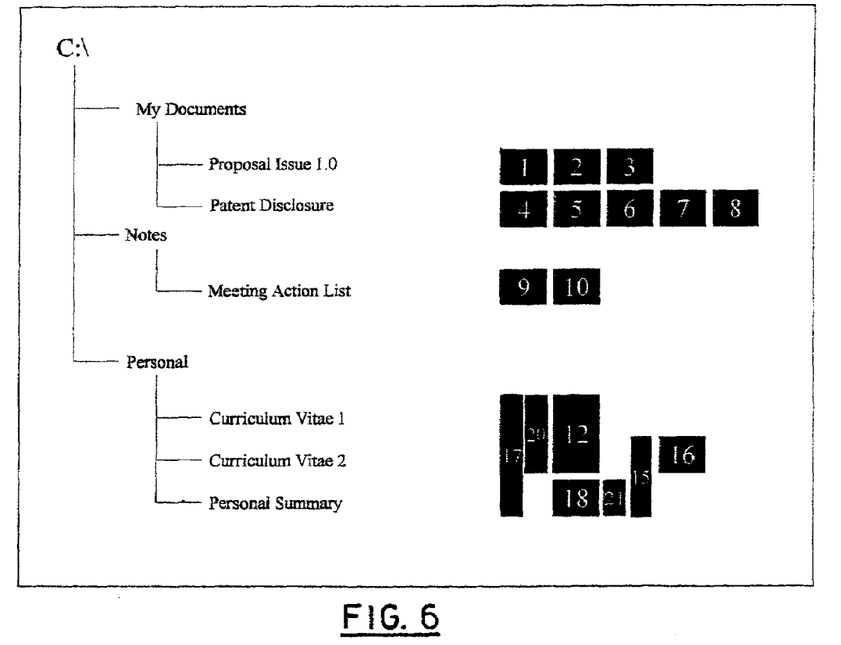
FIG. 6 represents an example in which there is a partial match between two of the Information Components of FIG. 5, such that the text which is common to both Components is abstracted into a new Information component referenced by two documents and a new Information component is created for the text which is unique to one of the documents.

Identification of sub components which include matching components but are not identical. For example, referring to FIG. 5, Information Components 15 and 19 may be almost identical. Perhaps Information Component's 15 and 19 each comprise a significant sized text string with just one phrase in Component 19 which is not in Component 15. This would enable a further revision of the File System as shown in FIG. 6—which could mean identifying the single phrase as a Component 21 so that duplication of Component 15 can be avoided.

The extent to which such separation of portions of Information Components into independent Components is desirable, to reduce storage requirements while avoiding creating an unnecessarily complex set of component indexes, can be taken into account within a set of storage management rules which include a minimum Component size parameter. For example a minimum sub-component size of 100 characters may be desirable for text documents, or a single presentation slide for graphics presentations.

Other parameters may also be taken into account when separating Components, and in some embodiments the storage management rules will enable a balancing between a range of criteria to determine an optimum separation of components for the current Component store. Algorithms such as auto correlation can be used to determine the optimum level of redundancy within a system. Since a target minimum sub-component size may be balanced against other factors to achieve optimised component storage, it may be possible for a single word to be identified as a separate Information Component if, for example, two documents only differ by a single word. (Consider the example where a company's legal department update a document to replace the words "our computer systems never fail" with the words "our computer systems rarely fail"). In some cases, small changes to a document may be significant to the context of the document and so identification of a small change as a separate Information Component can be helpful to enable automated construction of contextual documents (e.g. for automating currency conversion when changing nationality of target audience).

An additional parameter which can be controlled for optimising performance of the invention is the frequency of updates to the Component-based storage system. This will help to control processing overhead, but is unnecessary in many data processing systems. The frequency of updates is dependent on two different activities: the rate at which the user creates new documents or amends existing documents; and the rate at which an automated process updates the component store. The former activity typically does not present a problem, as user updates are relatively slow compared to the available processing power, and it is generally desirable to update the component store's indexing whenever a file is added or deleted. However, in some embodiments of the invention, for example in a relatively low processing power device such as a PDA, it will be appropriate when a file is amended by a user to initially only change the contents of a relevant Information Component. The analysis of the set of Information Components to determine whether Components should be added, split or merged to reflect the Component content changes is performed later, as an independent background process which runs when the processor has free capacity. An automated process for rationalising Information Components can be repeated, for example, at set time periods or when the data processing system or device is next switched on, etc. It should be noted that it is not necessary for the invention to ever achieve a perfectly optimised component-separation and storage rationalization—the invention may provide partially optimised results as a best compromise given the current processor load and any user-preferences for the frequency of updates.

A significant advantage of an Information Component based data storage system according to this embodiment of the invention is that the information is stored in a format which is particularly appropriate for monitoring, searching, indexing and exchanging information. The separation of files into Information Components provides a natural taxonomy capable of supporting advanced text mining and information construction techniques.

An example of use of an implementation of the Information Component based data storage system will now be presented and will demonstrate:

the separation of existing files into Information Components.

the indexing of the Information Components such that the files can be constructed.

a method for updating the components to reflect changes in the data.

Accordingly, the following description will outline the initial conversion of a text file into a series of Information Components. Having established the initial Component based information store, the description will demonstrate amendment of the information store to reflect the updating of the information by the user.

The algorithm used to separate the file content into Information Components proceeds as follows:

Paragraph separators (start of a new line) are identified for first level component separation. A title is identified as a separate paragraph.

The components identified by paragraph separators are then further abstracted into sub components by identifying full stops. A minimum size for a sub component is set, in this case equal to 100 characters, such that if a sub component is less than the minimum size it is merged with the smallest of its adjacent components.

Using this approach, the contents 110 of an original file such as shown in FIG. 7 can be marked up for representation as a set of components of the information store, by automated application of a set of rules. The file system is also amended such that any reference to the original file is replaced by a reference to component <1>. This markup of the file system is shown in FIG. 8. The index information 120 stored for document "IW Summary.doc" includes a document descriptor, which associates the document file name with Information Component <1>, plus a plurality of XML tag pairs (such as <1.1></1.1>) stored within the array of Information Components and serving to delimit the individual Components. A tagging scheme which is well suited to the present invention uses a numerically ordered and hierarchical sequence of XML tag pairs within the body of a text document, with a first tag pair <1></1> identifying and delimiting the Information Component corresponding to the full contents of the original file, and tag pairs <1.1></1.1>, <1.2></1.2> to <1.n></1.n> identifying the next level down in the hierarchy. The latter tag pairs may identify the set of text paragraphs within a text document if that is the Component-separation rule. Within each of the initially identified Information Components, for example within the component identified and delimited by tag pair <1.2></1.2>, any sub-components such as text sentences can be identified using tag pairs of the format <1.2.1></1.2.1>, <1.2.2></1.2.2>, etc. This can be extended to any desirable depth of hierarchy. Note that the sequential and hierarchical tag index scheme ensures that each Information Component's storage location relative to other Information Components within the file system can be determined from these unique tag pairs. FIG. 8 shows such an initial separation of a text file into Information Components based on a set of separation rules.

For a fully scalable solution, additional index information has proven useful. This has been implemented as a table indicating which character within the file system is the first character of an Information component having a reference tag pair within a given range. For example, it becomes faster to find component <2.1.2> given the knowledge that the first character of Information Component <2> is the 4,321st character of the file system and the first character of Information Component <3>is the 6,442nd character of the file system, since it is evident which portion of the file system to scan through. This is particularly useful when the file system is too large to all be held in memory at one time, such that different segments must be alternately loaded into memory. Furthermore, the index scheme comprising sequentially ordered, hierarchical tags and file descriptors which reference these tags facilitate addition of further index information or meta data as required.

Having established the initial Information store it is now possible to consider amendments to the Information store in response to user activity. In amending the Information store, it may be necessary to:

split an individual Information Component.

insert a new Information Component.

add a new Information Component.

delete an Information Component

Split Component

Consider a scenario in which a computer user is asked to provide a definition of Information Warfare for use in a presentation. In response to this request the user opens the document, IW Summary.doc, cuts and edits the first paragraph into a new document called IW Definition.doc. The result of this activity is shown in FIG. 9. Whilst the user still perceives the existence of two separate files, the Information store is actually amended as shown in FIG. 10. Note that text strings which are unique to the document IW Summary.doc (i.e. not included in IW Definition.doc) are separated and indexed separately from components which are common to the two documents—for example separating out the text component <1.1.1.2>, penetrate and inhibit</1.1.1.2> and separately indexing the other portions of component <1.1.1> using <1.1.1.1></1.1.1.1> and <1.1.1.3></1.1.1.3>. This has enabled avoidance of duplication of text within the Component store.

Insert Component

Consider a scenario in which the user receives a further request for a description of Information Warfare. In this scenario the information is required for inclusion in a marketing/business document. The user opens the document, IW Summary.doc, cuts and edits the first paragraph into a new document called IW Business.doc. The user's view of this activity is shown in FIG. 11. The user now perceives the existence of three separate files, but the Information store is actually amended as shown in FIG. 12.

Add Component

Next, consider the scenario where, following feedback, the user decides to add a further paragraph to the IW Business.doc. The amendment of the document is shown in FIG. 13. The Information store is amended as shown in FIG. 14.

Delete Component

When an Information Component is deleted from one document, the index information for that Information Component is simply deleted from the document descriptor. A cleanup agent running in the background trawls through the XML tags and document descriptors to identify unreferenced Information Components and then removes these from the store.

Figure 15:
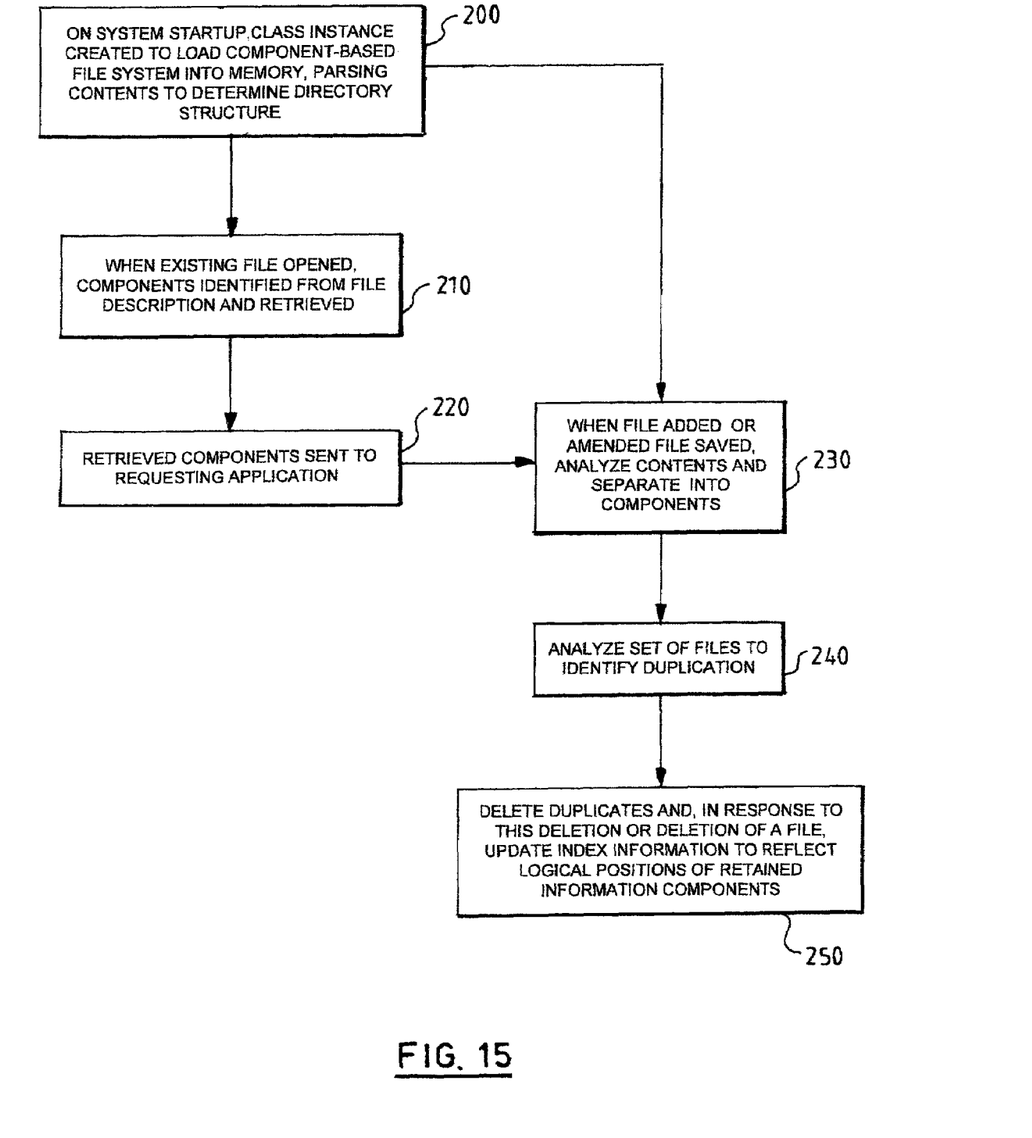
FIG. 15 shows steps of a method according to an embodiment of the invention.

The steps of a method implementing the present invention are summarised in FIG. 15. Firstly, let us assume that a computer system includes a plurality of user-created text documents within its operating system's file system, and each of these are perceived to be independent files by the system user. Program code implementing a component-based file system according to the invention is also installed on the computer system. All of the text documents, perceived as a set of separate files by the user, are stored in a single text file within the system's non-volatile storage. This single text file contains index information, describing which Information Components are included in which documents, and a collection of tagged Information Components.

A set of File Entry descriptions encapsulating a file name and the list of Information Components it includes may be stored at the beginning of the text file adjacent the tagged Information Components using the following format:

<File Entry>D:My Documents/IW
Business.doc<1>/FileEntry><FileEntry>D:My
Documents/IW
Overview.doc<1>–<1.1.3<>/FileEntry<>1> . . . >/1< . . .
etc.

where <FileEntry> . . . </FileEntry>delimits a File Entry description and <n> . . . </n>delimits an Information Component.

When the system is switched on or rebooted, an instance of a Java class is created and loads 200 the component-based file system into system memory. This involves opening the text file which contains the set of documents and parsing the contents to identify the separate Information Components and the separate descriptions of documents. An array structure is used to store each instance of a document-describing 'File Entry' which comprises the full file name (including path) corresponding to a conventional file name together with the File Entry Component Description which identifies the relevant set of components in order. For example:

ARRAY [1]: D:/My Documents/IW Business.doc<1>
ARRAY [2]: D:/My Documents/IW Overview.doc<1>–<1.1.3>
ARRAY [3]: D:/My Documents/IW Summary.doc<1.1.1>+<1.2>

In addition to the array explained above, a tree is constructed which describes the directory structure and is used in displaying the structure to the user in a file dialogue box. The actual Information Components are loaded into a single Java string. (Java is a trademark of Sun Microsystems Inc).

When the user opens a file (e.g. when word processing), the File Entry array is used to look up the File Entry Component description. The document is then constructed 210 as specified for the File Entry Component description. For example:

1. if the user opens "IW Overview.doc", the system retrieves a copy Information Component <1>, deletes subcomponent <1.1.3> and returns 220 the result to the requesting application (via the Publish/subscribe broker).

2. if the user opens "IW Summary.doc", the system retrieves copies of Information Components <1.1.1> and <1.2>, concatenates the Components and returns 220 the result to the requesting application (via the Publish/Subscribe broker).

The identification and extraction of Information Components is achieved using simple Java String methods:

indexOf( )—performs a quick search and returns the first character index of a specified string (or character) after a specified start point; and Substring( )—returns a substring between two points.

On adding a new file to the system, a conversion Java class separates 230 the file into Information Components. In the present embodiment, the text file conversion algorithm implemented by this class simply identifies paragraphs and sentences greater than a minimum number of characters, and if a paragraph is less than the minimum number of characters it is concatenated with the next paragraph. The abstracted components are published such that they can be stored by the Information Component-based storage system. This storage system creates a new File Entry element in the array and stores the file name and the File Entry Component Description. The Information Components are then compared in turn with each existing Information Component by character and string matching. In a first implementation, a correlation measurement is taken between strings as each new Component is "slid" past every existing component (i.e. character matching is performed iteratively for multiple relative positions of the new and each existing component, to generate a correlation score). A correlation factor result which exceeds a threshold score is followed by a check that the correlation factor has not resulted from a number of independent character matches but from a single matching sequence corresponding to a positive component match. The results of this correlation determine subsequent actions:
1. if no match is found the Component is added to the Component storage string.
2. if a match is found the Component is not added to the Component storage string and the File Entry Component Description is constructed to reference the existing component.

If a Component is amended by a user the File Entry Component Description is automatically amended by the Information Component-based storage system as explained above.

Thus, the storage system analyzes 230 the contents of user-created files to identify an initial set of Information Components by applying a set of rules for Component separation, such as the example of identifying paragraph separators within a text document. In the example embodiment described previously, full stops are identified to further segment paragraphs into sentences which each correspond to an Information Component.

Next, each component is selected in turn as a search string which is used for comparing 240 Information Components to identify duplicates within the set of files stored in the data repository. When duplicates are identified, storage rationalisation 250 is carried out. This involves deleting duplicates to remove all except one copy of each Information Component from storage, and updating the index information stored in association with the Information Components.

The above description has demonstrated the initial construction and subsequent maintenance of an Information store comprising a series of Information Components. The features and functionality described above also facilitate efficient development of standard applications and, furthermore, enable development of a number of more advanced and novel applications.

An application program which uses the architecture of the present invention is an advanced word processing document which enables automatic document creation. Existing, proprietary systems typically inhibit the integration between information content searching, information management, and information fusion which is enabled by the present invention, such that the functionality of this word processing application has not been readily achievable prior to the present invention.

Figure 16:
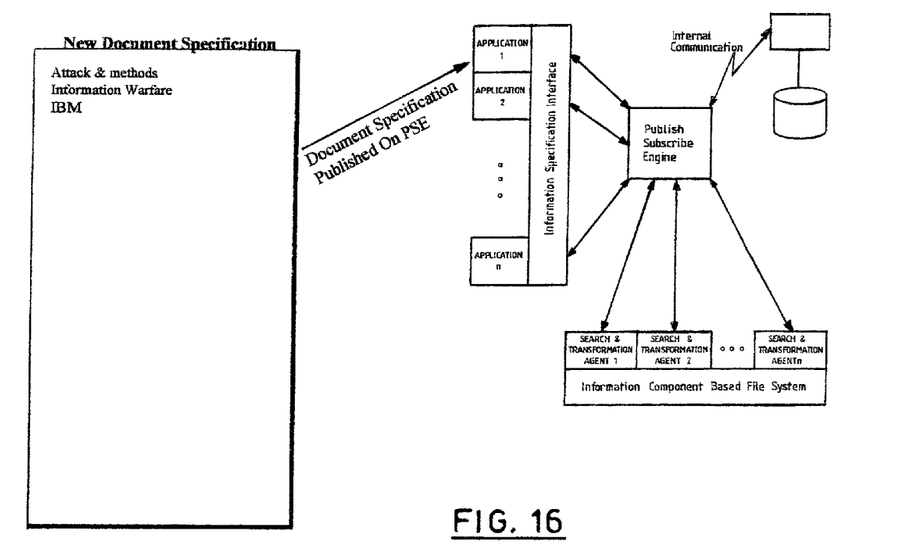
FIG. 16 shows an example document specification and a representation of publication of the specification as information requests.

The word processor application according to this aspect of the invention is preferably implemented as a standalone Java Application. On initiation, the user is presented with a standard interface similar to that provided by existing systems. The user is able to open existing files or generate a new document. Considering the situation in which the user creates a new document, the user is able to enter a document specification as shown in FIG. 16. This specification represents a user request for 3 sections relating to the key words/phrases:
"Attack & methods".
"Information Warfare."
"IBM."

A more advanced specification is also supported where the user is able to state features such as:
the length of the section.
the style of the section.
the source of the information used to create the section.
the date of the source information used to create the section.

The application extracts the specification from the text window and generates a series of Information Request messages based on the standards specified in the Information Specification Interface.

Having constructed Information Request messages, the application publishes the Information Requests using the Publish/Subscribe engine under the topic "Information Request". Included in the Information Request messages are unique response topics such that the application is able to monitor system responses. The publication of the Information Requests is represented in FIG. 16. This has been implemented, in a first example embodiment, as a Microsoft Word plug-in which extracts the user's search terms from a Word document and passes them to a DLL for publishing via the publish/subscribe engine. The results (see below) can then be displayed within the document with a dialogue box enabling the user to publish the results via the publish/subscribe engine.

Figure 17:
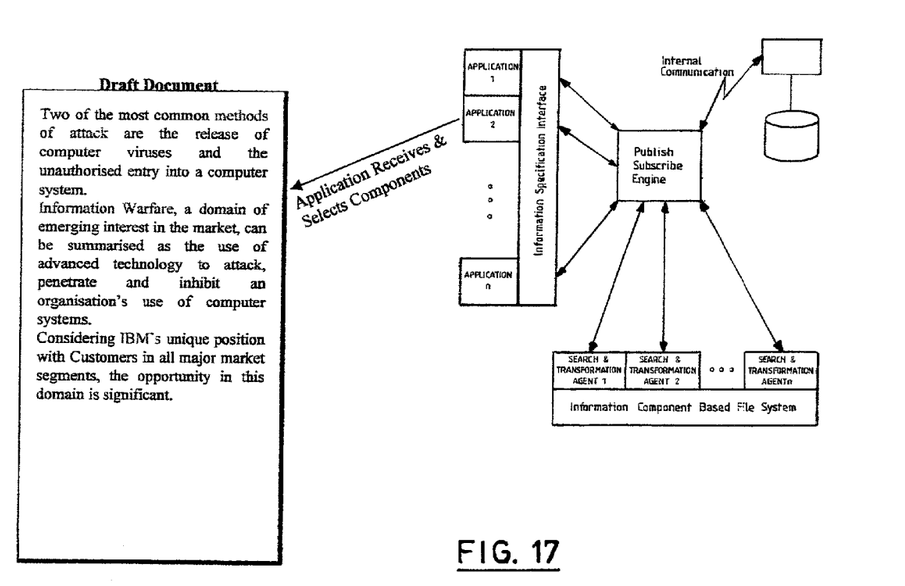
FIG. 17 shows an example document created in response to user-initiated information requests.

A Search & Transformation Agent has been implemented as a stand alone Java Application and is initiated with a handle to the Information Component Based File System. The Search Agent subscribes to the Information Request topic and therefore receives the Information Request messages published by the Word Processor Applications. Having received an Information Request message the Search Agent passes a search request, including the keyword specification, to the Information Component Based File System. The Information Component-based file system returns all Information Components which match the specification to the Search Agent which in turn publishes the responses using the Publish Subscribe Engine. The unique response topics enable the Word Processor Application to receive responses to the Information Request messages. The Word Processor application stores all the responses to Information Request messages and provides the user with the ability to select the most appropriate responses. The Information Components which are received in response to Information Request messages are fused by the Word Processor application to form a document as shown in FIG. 17.

At this stage, the Word Processor application provides the functionality for the user to:
select an alternative response in the cases where multiple Information Components were returned;
edit the document to amend the Information Components in order to meet the document purpose; and
add meta data to any of the returned Information Components.

The ability to add meta data to sub-sections of a file to enhance future searches is a significant novel feature which is not enabled by known systems. The meta data can be represented in the aforementioned single text file which represents the complete data of the component-based file system, in accordance with the previously described tagging scheme. For example, if the meta data to be associated with the Information Component having unique identifier 1.1.1, this can be represented as:
<MetaData><1.1.1>Definition</1.1.1></MetaData>

The Word Processor application is then able to generate Feedback messages detailing:
the original request.
the selected information component.
the amendments made to the Information Component.
the meta data attached to an Information Component.

The Feedback messages are published using the Publish Subscribe Engine and are used by the Search and Transformation Agents to improve the performance of the Search process. The new Information Components and the meta data are stored in the Information Component-based file system for future reference.

The above-described architecture supports the integration of advanced Search & Transformation Agents. For example, consider the scenario in which the user searches for product information, amends the returned Information Components and adds meta data. The user is able to add a meta data tag to the original returned Information Component which describes the Component as "scientific". Having made amendments to the Information Component's content the user is able to add a further tag, "marketing". In this way the published Feedback message represents a very rich training set for the development of a Search & Transformation Agent which is capable of converting scientific Information Components to marketing Information Components.

The data storage and management architecture described herein is capable of supporting many advanced applications, such as the Word Processor application described above. Another example application is an intelligent e-mail application, which is able to subscribe to the Word Processor Information Request topics such that a profile of user interests is maintained. In cases where an e-mail is received containing appropriate information, the e-mail application could automatically initiate the construction of a new document. Alternatively, using scalable distributed message brokers it would be possible to enable enterprise wide Information Requests.

What is claimed is:

1. A method of managing data storage in a data processing apparatus, the data processing apparatus including an information repository comprising a physical data storage medium and data structures for storing index information for locating data in the data storage medium, the method comprising the steps of:

analyzing the contents of the set of files to identify components of the file contents which have duplicates within different files within the set;

deleting duplicate components from the information repository while retaining at least one copy of each component, and generating index data for the retained copies which reflects the respective logical positions within the information repository corresponding to the positions of the retained copies and their deleted duplicates, and generating index data for remainder components which correspond to the remainder portions of a file after separation of duplicated components which remainder component index data reflects the logical positions of the remainder components within the information repository;

storing the generated index data;

communicating through an information specification interface with application programs for analyzing contents, deleting duplicates, and generating indexes, the application programs registering as publishers and as subscribers for information;

publishing an information request message that includes a response topic for an application program through the information specification interface;

comparing information components created by a first application program with other application programs' subscriptions using the response topic of each information request; and notifying an application program when a created information component matches the application program's subscriptions in response to monitoring an information component comprising a specified response topic for the application program.

2. A method according to claim 1, wherein the analysis of file contents comprises the steps of:

separating file contents into a set of information components comprising sub-sections of a file's contents, in accordance with predefined separation criteria; and analyzing the contents of said information components to identify duplicates.

3. A method according to claim 2, wherein the step of separating a file's contents into information components is initiated in response to a step of saving the file, and the steps of analyzing the contents to identify duplicates and then deleting duplicates are performed by a background process independently of user-controlled operations.

4. A method according to claim 2, wherein said step of separating file contents comprises identifying a file type, selecting predefined separation criteria for the identified file type, and separating file contents in accordance with the selected separation criteria.

5. A method according to claim 1, including the step of identifying information components corresponding to sub-sections of an identified component of a file's contents, which sub-sections have duplicates within different files within the set, and performing in relation to said sub-section components said steps of deleting duplicates and generating and storing index data for retained single copies of duplicated sub-section components and generating and storing separate index data for remainder sub-section components.

6. A method according to claim 5, wherein said steps of deleting duplicates and generating separate index data is performed subject to a defined minimum component size.

7. A method according to claim 1, wherein the generated index data comprises:

a set of file descriptions which each include an ordered list of identifiers of components corresponding to the contents of the respective file and information defining a path within a directory structure corresponding to the logical location of the file within the directory structure; and a set of unique component identifiers to be stored in association with respective components.

8. A method according to claim 7, wherein the index data is implemented using markup tags, with each unique component identifier comprising a unique tag pair identifying and delimiting the respective component within the information repository and said ordered list of component identifiers within each file description comprising a list of markup tags.

9. A method according to claim 7, wherein the index data additionally comprises:

an indication of the locations within the information repository of members of said set of unique component identifiers.

10. A data processing apparatus comprising:

an information repository for storing a set of files and for storing index information for locating files within the information repository;

controller components for controlling the operation of the data processing apparatus to perform the following method steps analyzing the contents of a set of files stored in the information repository to identify components of the file contents which have duplicates within different files within the set;

deleting duplicate components from the information repository while retaining at least one copy of each component, and generating index data for the retained copies which reflects the respective logical positions within the information repository corresponding to the positions of the retained copies and their deleted duplicates, and generating index data for remainder components which correspond to the remainder portions of a file after separation of duplicated components which remainder component index data reflects the logical positions of the remainder components within the information repository; and storing the generated index data; and a publish/subscribe engine connected by an information specification interface for communication between application programs and said controller components for analyzing contents, deleting duplicates and generating indexes, wherein the publish/subscribe engine registers the application programs as publishers and as subscribers for information, an application program publishing an information request message that includes a response topic through the information specification interface, the publish/subscribe engine comparing information components created by a first application program with other application programs' subscriptions, and notifying an application program when a created information component matches the application program's subscriptions in response to monitoring an information component comprising a specified response topic for the application program.

11. A data processing apparatus according to claim 10, wherein the controller component for generating index data is adapted to generate:

a set of file descriptions, which each include an ordered list of identifiers of information components corresponding to the contents of the respective file and information defining a path within a directory structure corresponding to the logical location of the file within the directory structure; and a set of unique component identifiers to be stored in association with respective components;

wherein the apparatus further comprises a component for analysing the index data for all components of the set of files to identify and generate a representation of a directory structure.

12. A data processing apparatus according to claim 10, including one or more search agents for performing search and retrieval operations from the information repository in response to information requests from one or more application programs.

13. A computer program product comprising program code recorded on a computer-readable recording medium, the program code including instructions for controlling the operation of a data processing apparatus, when executed thereon, to perform a method for managing storage of a set of files within an information repository, the information repository comprising a physical data storage medium and data structures for storing index information for locating files in the physical data storage medium, wherein the program code comprises:

means for analyzing the contents of the set of files to identify components of the file contents which have duplicates within different files within the set by seperating the file contents into a set of information components comprising sub-sections of a file's contents, in accordance with predefined separation criteria and in response to a saving of the file and analyzing the contents of said information components to identify duplicates by a background process independently of user-controlled operations;

means for deleting duplicate components from the information repository by a background process independently of user-controlled operations while retaining at least one copy of each component, and for generating index data for the retained copies which reflects the respective logical positions within the information repository corresponding to the positions of the retained copies and their deleted duplicates, and for generating index data for remainder components which correspond to the remainder portions of a file after separation of duplicated components which remainder component index data reflects the logical positions of the remainder components within the information repository;

means for storing the generated index data;

means for communicating through an information specification interface with application programs for analyzing contents, deleting duplicates and generating indexes, the application programs registering as publishers and as subscribers for information;

means for publishing an information request message that includes a response topic for an application program through the information specification interface;

means for comparing information components created by a first application program with other application programs' subscriptions using the response topic of each information request; and means for notifying an application program when a created information component matches an application program's subscriptions in response to monitoring an information component comprising a specified response topic for the application program.

* * * * *